(12) United States Patent
Abe

(10) Patent No.: US 12,512,651 B2
(45) Date of Patent: Dec. 30, 2025

(54) CABLE LEAD-IN MEMBER, ELECTRIC DEVICE CONTROL SYSTEM, AND LIQUID APPLICATION SYSTEM

(71) Applicant: Kenichi Abe, Kanagawa (JP)

(72) Inventor: Kenichi Abe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/597,945

(22) Filed: Mar. 7, 2024

(65) Prior Publication Data
US 2024/0313514 A1  Sep. 19, 2024

(30) Foreign Application Priority Data
Mar. 15, 2023 (JP) .................. 2023-041175

(51) Int. Cl.
*H02G 15/013* (2006.01)
*B25J 11/00* (2006.01)
*H02G 3/04* (2006.01)

(52) U.S. Cl.
CPC ........ *H02G 3/0443* (2013.01); *B25J 11/0075* (2013.01)

(58) Field of Classification Search
CPC .. H02G 3/0443; H02G 3/0691; H02G 3/0675; H02G 15/013; H02G 15/04; B25J 11/0075
See application file for complete search history.

(56) References Cited

U.S. PATENT DOCUMENTS

| | | | | |
|---|---|---|---|---|
| 10,737,642 B2 * | 8/2020 | Takahashi | ........... | B60R 16/0215 |
| 2017/0331263 A1 * | 11/2017 | Matsumura | .......... | H02G 3/0437 |
| 2024/0305083 A1 * | 9/2024 | Komori | .................. | H02G 3/088 |

FOREIGN PATENT DOCUMENTS

| | | |
|---|---|---|
| CN | 107112731 A | 8/2017 |
| DE | 889 633 C | 9/1953 |
| FR | 2 899 731 A1 | 10/2007 |
| JP | S59-078821 U | 5/1984 |
| JP | 2003-289611 A | 10/2003 |
| JP | 2009-175654 A | 8/2009 |
| JP | 2011-062052 A | 3/2011 |
| KR | 10-2005-0024300 A | 3/2005 |

OTHER PUBLICATIONS

Partial European Search Report issued Jul. 24, 2024 in European Patent Application No. 24158350.9, 14 pages.
Office Action issued Jul. 25, 2025 in Korean Patent Application No. 10-2024-0034392, 10 pages.

* cited by examiner

*Primary Examiner* — Amy J. Sterling
(74) *Attorney, Agent, or Firm* — XSENSUS LLP

(57) ABSTRACT

A cable lead-in member includes a first member and a cover member. The first member is to be attached to a lead-in port through which a cable is to be led inside. The cover member protects the first member. The cover member is divisible in a direction crossing a direction in which the cable is to be led inside.

15 Claims, 3 Drawing Sheets

CABLE LEAD-IN MEMBER, ELECTRIC DEVICE CONTROL SYSTEM, AND LIQUID APPLICATION SYSTEM

CROSS-REFERENCE TO RELATED APPLICATION

This patent application is based on and claims priority pursuant to 35 U.S.C. § 119(a) to Japanese Patent Application No. 2023-041175, filed on Mar. 15, 2023, in the Japan Patent Office, the entire disclosure of which is hereby incorporated by reference herein.

BACKGROUND

Technical Field

Embodiments of the present disclosure relate to a cable lead-in member, an electric device control system, and a liquid application system.

Related Art

For example, a configuration has been proposed in which a securing screw of a gland member is screwed into a screw hole of a container and in addition, a locknut is screwed onto the securing screw to secure the gland member to a cable lead-in portion of the container.

It is necessary for the cable lead-in portion to have, for example, a function of protecting the surface of a cable from an external load, and a function of preventing entry of foreign matter into a container (coupling box) into which the cable is led. Conventionally, such a plurality of functions is provided in an integrated component. Therefore, when one of the plurality of functions does not work, it is necessary to replace the entire component, and replacement of the component will cost more than necessary.

SUMMARY

According to an embodiment of the present disclosure, a cable lead-in member includes a first member and a cover member. The first member is to be attached to a lead-in port through which a cable is to be led inside. The cover member protects the first member. The cover member is divisible in a direction crossing a direction in which the cable is to be led inside.

According to another embodiment of the present disclosure, an electric device control system includes an electric device, the cable lead-in member, a controller, and a coupling portion. The controller controls the electric device. The coupling portion couples an electric device-side cable and a controller-side cable. The electric device-side cable is from the electric device. The controller-side cable is from the controller. The coupling portion is provided with a lead-in port for the electric device-side cable and a lead-in port for the controller-side cable. The cable lead-in member is provided at at least one of the lead-in port for the electric device-side cable and the lead-in port for the controller-side cable.

According to still another embodiment of the present disclosure, a liquid application system includes the electric device control system. The electric device includes a liquid application apparatus to apply a liquid to a target object.

According to at least one embodiment of the present disclosure, the cost of part replacement for a cable lead-in member can be reduced.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
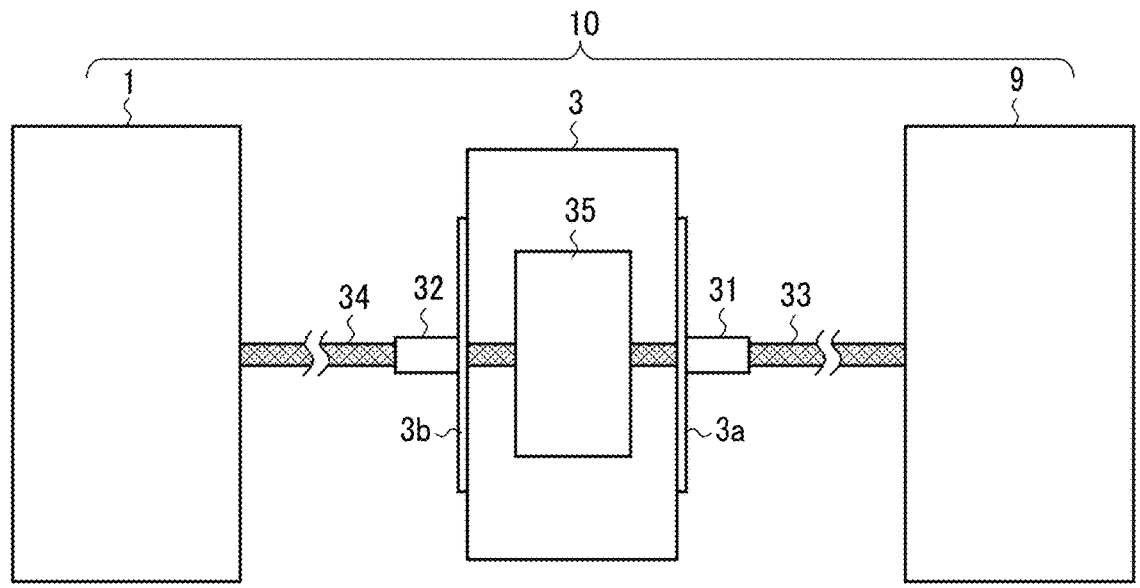
FIG. 1 is a schematic diagram of an electric device control system.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, an embodiment for carrying out the present disclosure will be described with reference to the drawings.
Outline of Electric Device Control System An outline of an electric device control system will be described with reference to FIG. 1. FIG. 1 is a schematic diagram of the electric device control system.

An electric device control system 10 includes an electric device 1, a coupling box 3, a control panel 9, and the like. The electric device 1 is coupled to the control panel 9 via an electric cable. The electric device 1 is not particularly limited. Examples of the electric device 1 include an industrial robot and a machine tool. The coupling box 3 is provided between the electric device 1 and the control panel 9. The coupling box 3 includes a coupling surface 3a and a coupling surface 3b. The coupling surface 3a is for coupling the control panel 9. The coupling surface 3b is for coupling the electric device 1. Here, the coupling box 3 is an example of a "coupling portion". The control panel 9 is an example of a "controller".

A control panel-side cable 33 from the control panel 9 is passed through a control panel-side cable lead-in portion 31 provided on the coupling surface 3a of the coupling box 3, and is led into the coupling box 3. An electric device-side cable 34 from the electric device 1 is passed through an electric device-side cable lead-in portion 32 provided on the coupling surface 3b of the coupling box 3, and is led into the coupling box 3. A connection means 35 including, for example, a terminal block is provided inside the coupling box 3. The control panel-side cable 33 and the electric device-side cable 34 led into the coupling box 3 are connected by the connection means 35.

The control panel 9 transmits a control signal for instructing the electric device 1 to operate, to the electric device 1 through the control panel-side cable 33, the connection means 35, and the electric device-side cable 34. Furthermore, the control panel 9 receives information indicating an operating state of the electric device 1 from the electric device 1 through the electric device-side cable 34, the connection means 35, and the control panel-side cable 33.

Configuration of Liquid Application System

Figure 2:
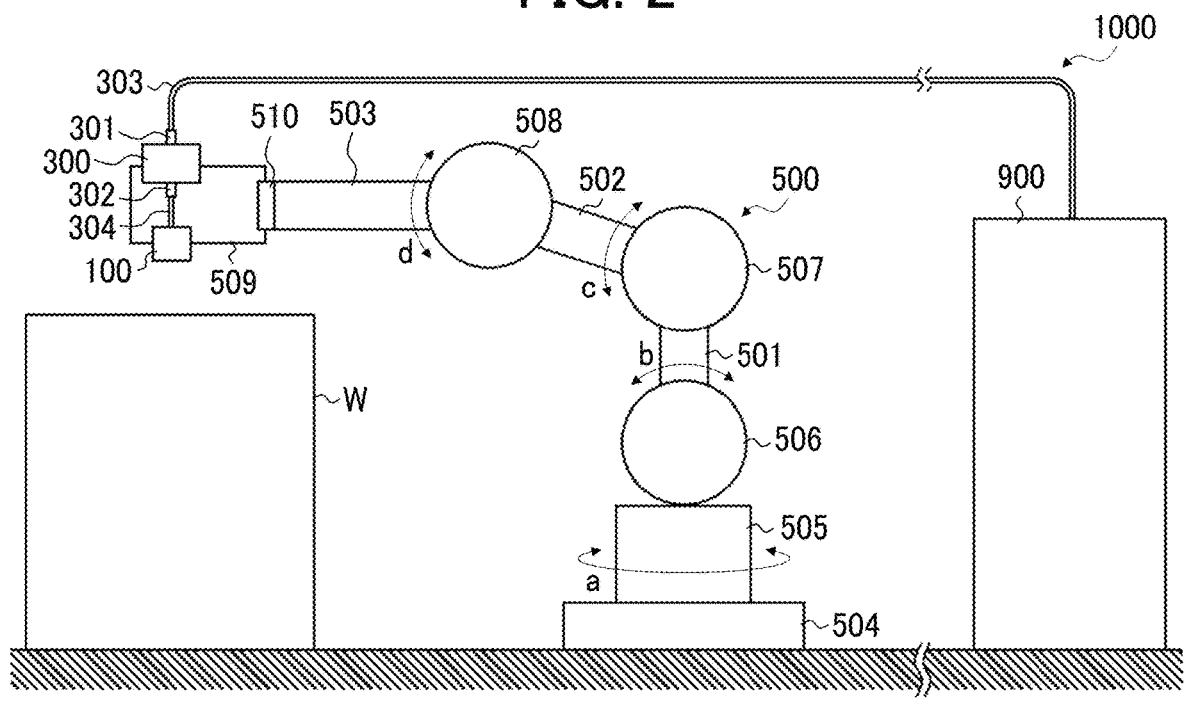
FIG. 2 is a configuration diagram illustrating an example of a liquid application system.

FIG. 2 is a configuration diagram illustrating an example of a liquid application system, and illustrates an application example of the electric device control system illustrated in FIG. 1.

A liquid application system 1000 includes a robot 500 and a control panel 900. The robot 500 is, for example, an articulated robot, and includes a head 100 located at the end of a robot arm. The robot 500 can freely move the head 100 with respect to a target object W to accurately place the head 100 at a position at which liquid is to be applied to the target object W. The head 100 placed at the position at which liquid is to be applied applies liquid such as paint or ink to the target object W, and performs painting or image formation on the target object W. Here, the head 100 is an example of a "liquid application apparatus".

The robot 500 includes an installation base 504, a first arm 501, a second arm 502, a third arm 503, a movable portion 505, a first joint portion 506, a second joint portion 507, a third joint portion 508, a head holding portion 509, a chuck portion 510, and the like.

The installation base 504 is a base member for supporting the movable portion 505 and portions above the movable portion 505 in the drawing. The movable portion 505 provided on the installation base 504 is supported by the installation base 504 in such a way as to be rotatable in a horizontal direction (direction of arrow "a") with respect to the installation base 504. The first joint portion 506 is provided on the movable portion 505. The first joint portion 506 is coupled to one end of the first arm 501, and supports the first arm 501 such that the first arm 501 is rotatable in a direction of arrow "b". Another end of the first arm 501 is coupled to one end of the second arm 502 via the second joint portion 507.

The second joint portion 507 supports the second arm 502 such that the second arm 502 is rotatable in a direction of arrow "c". Another end of the second arm 502 is coupled to one end of the third arm 503 via the third joint portion 508. The third joint portion 508 supports the third arm 503 such that the third arm 503 is rotatable in a direction of arrow "d". Note that the directions of rotation of the movable portion 505 and the arms 501, 502, and 503 are examples, and is not limited to the above. For example, an axis orthogonal to an axis of rotation in each of the rotation directions "b", "c", and "d" may be provided to add motion of rotation around this axis.

The chuck portion 510 is provided at another end of the third arm 503. The head holding portion 509 is installed on the chuck portion 510 in such a way as to be detachable from the chuck portion 510. The head 100 that applies liquid to the target object W is attached to the head holding portion 509.

Liquid to be applied from the head 100 is not particularly limited as long as the liquid has viscosity and surface tension that allows the liquid to be applied from the head 100.

Meanwhile, it is desirable for the liquid to have a viscosity of 30 mPa·s or less at normal temperature and normal pressure or when heated or cooled. Examples of the liquid include a solution, a suspension, or an emulsion that contains, for example, a solvent, such as water or an organic solvent; a colorant, such as dye or pigment; a functional material, such as a polymerizable compound, a resin, or a surfactant; a biocompatible material, such as DNA, amino acid, protein, or calcium; an edible material, such as a natural colorant; an active material and a solid electrolyte used as an electrode material; or ink containing a conductive material or an insulating material.

The above can be used for, for example, inkjet ink, paint, surface treatment liquid, liquids for forming constituent elements of electronic elements or light-emitting elements or forming resist patterns of electronic circuits, material liquid for three-dimensional modeling, electrodes, and electrochemical elements.

Examples of the target object W include three-dimensional objects like bodies of conveyances, such as bodies of an automobile and a railway vehicle, a body of an aircraft, and a hull of a ship, and plate-like objects such as outer wall materials and ceiling/floor materials for buildings. However, the target object W is not limited to the above. The target object W may be made of any material as long as liquid can adhere to the material at least temporarily. Examples of the material of the target object W include paper, thread, fiber, cloth, leather, metal, plastic, glass, wood, and ceramics. Alternatively, the target object W may be a current collector made of aluminum foil or copper foil, or may be an electrode including a current collector on which an active material layer has been formed.

The head 100 attached to the head holding portion 509 corresponds to the electric device 1 in the electric device control system 10 illustrated in FIG. 1, and is coupled to the control panel 900 via an electric cable. The control panel 900 corresponds to the control panel 9 in the electric device control system 10 illustrated in FIG. 1. A coupling box 300 is provided between the head 100 and the control panel 900.

The coupling box 300 is attached to the head holding portion 509, for example. The coupling box 300 need not be installed on the head holding portion 509, and may be installed at another position (portion) of the robot 500. Furthermore, the coupling box 300 need not be installed on the robot 500, and may be disposed at an appropriate position between the head 100 and the control panel 900.

A control panel-side cable 303 from the control panel 900 is passed through a control panel-side cable lead-in portion 301 provided at the coupling box 300, and is led into the coupling box 300. A head-side cable 304 from the head 100 is passed through a head-side cable lead-in portion 302 provided at the coupling box 300, and is led into the coupling box 300. As in the coupling box 3 illustrated in FIG. 1, a connection means including, for example, a terminal block is provided inside the coupling box 300, and the control panel-side cable 303 and the head-side cable 304 led into the coupling box 300 are connected by the connection means.

The control panel 900 transmits a control signal for instructing the head 100 to perform liquid applying operation, to the head 100 through the control panel-side cable 303, the coupling box 300, and the head-side cable 304. In addition, the control panel 9 receives information indicating an operating state of the head 100 from the head 100 through the head-side cable 304, the coupling box 300, and the control panel-side cable 303.

Incidentally, solvent may be used as liquid in the liquid application system 1000 configured as described above. In this case, the liquid application system 1000 needs to be configured in such a way as to satisfy, for example, the following conditions: the surface of the electric cable between the head 100 and the control panel 900 is doubly protected, no gas (volatilized solvent or the like) flows into the coupling box, and the cable lead-in portions are protected from an external load.

The weight of the electric cable increases due to specifications for satisfying the above conditions. As a result, the weight of the electric cable reaches several tens of kilograms when the head 100 and the control panel 900 are directly coupled by means of the single electric cable without involving the coupling box 300. Therefore, in a case where the head 100 is replaced with another head, an operator needs to carry or lay a heavy electric cable. This causes a heavy burden on the operator.

In addition, when the coupling box 300 is interposed between the head 100 and the control panel 900, it is necessary to protect the head-side cable 304 with a metal member at the head-side cable lead-in portion 302 in terms of safety. Meanwhile, at the control panel-side cable lead-in portion 301, the control panel-side cable 303 need not be protected with a metal member, and may be protected with a resin member.

Therefore, the configuration of the control panel-side cable lead-in portion 301 where the cable may be protected with a resin member has been improved in the present embodiment. It is thus possible both to reduce the cost of part replacement for the cable lead-in member and to improve workability of the control panel-side cable 303. Hereinafter, the configuration of the control panel-side cable lead-in portion 301 will be described in detail.

Configuration of Cable Lead-In Portion

Figure 3:
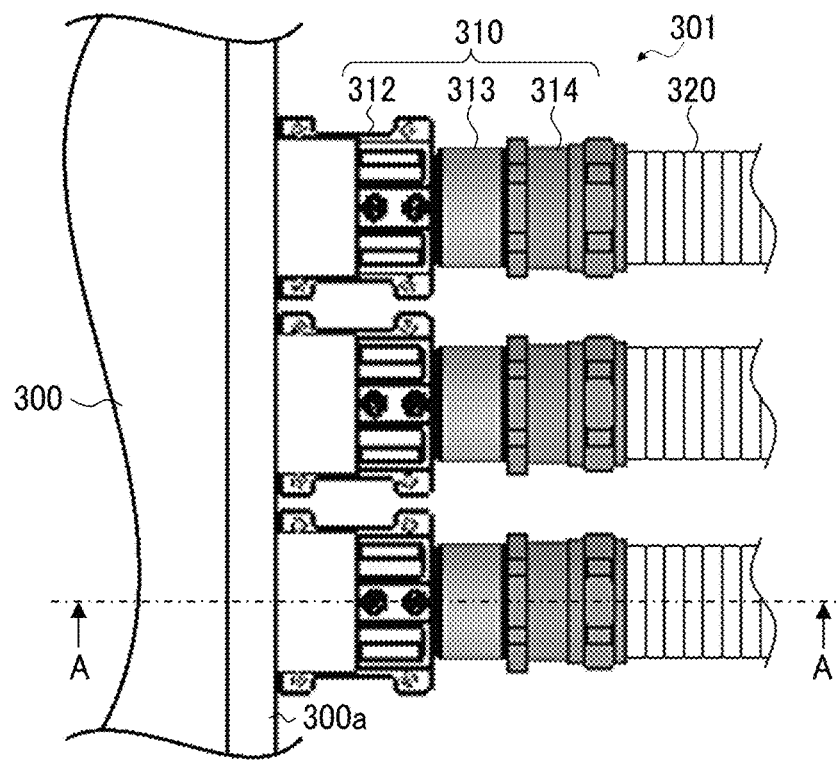
FIG. 3 is an external view of a cable lead-in portion in a coupling box.
Figure 4:
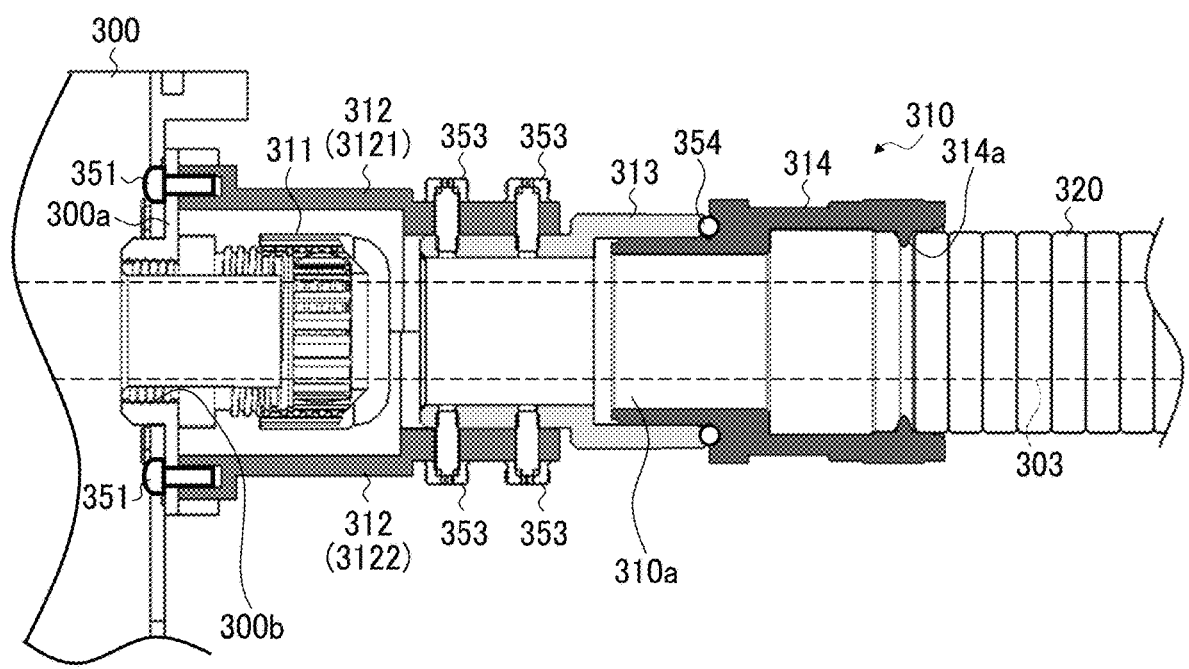
FIG. 4 is a cross-sectional view of the cable lead-in portion.
Figure 5:
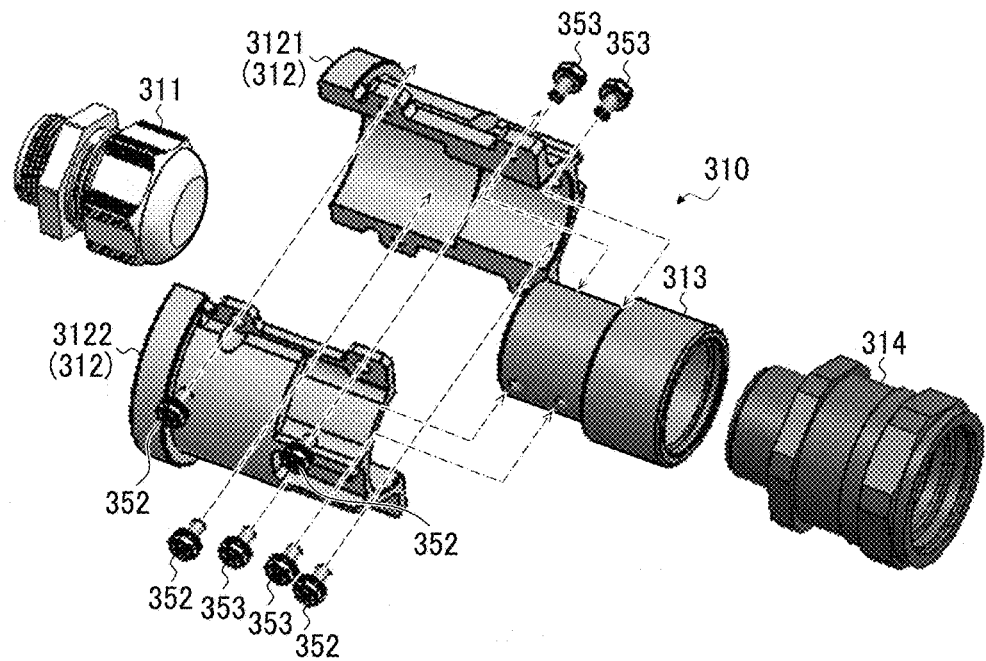
FIG. 5 is an exploded perspective view of a cable lead-in member.

The configuration of the cable lead-in portion will be described in detail with reference to FIGS. 3 to 5. FIG. 3 is an external view of the cable lead-in portion in the coupling box. FIG. 4 is a cross-sectional view of the cable lead-in portion, and illustrates a cross section taken along line A-A in FIG. 3. FIG. 5 is an exploded perspective view of the cable lead-in member.

In FIG. 3, cable lead-in members 310 are provided in the control panel-side cable lead-in portion 301. The cable lead-in members 310 are attached to a control panel-side coupling surface 300*a* of the coupling box 300. Each cable lead-in member 310 includes a cover member 312, a cable gland (to be described below), an intermediate coupling member 313, and a cable protecting tube coupling member 314. The cable gland is covered with the cover member 312.

One end (on the right side in the drawing) of the cable protecting tube coupling member 314 is coupled to one end of a cable protecting tube 320. Another end of the cable protecting tube 320 is coupled to the control panel 900 or the like. The control panel-side cable 303 illustrated in FIG. 2 is passed through the cable protecting tube 320. Thus, the cable protecting tube 320 protects the control panel-side cable 303 from an external load.

FIG. 3 illustrates an example of a case where three heads 100 are mounted on the robot 500, and illustrates a configuration in which three control panel-side cables corresponding to three head-side cables led into the coupling box 300 from the three heads are led into the coupling box 300. However, the number of the cable lead-in members 310 does not necessarily need to be equal to the number of electric cables. For example, two electric cables corresponding to two heads may be passed through a single cable lead-in member 310.

As illustrated in FIGS. 4 and 5, the cable lead-in member 310 includes the cover member 312, a cable gland 311, the intermediate coupling member 313, and the cable protecting tube coupling member 314. The cable gland 311 is covered with the cover member 312.

The cable gland 311 is attached to a lead-in port 300*b* provided on the control panel-side coupling surface 300*a* of the coupling box 300. The control panel-side coupling surface 300*a* is made of, for example, an aluminum alloy. A female screw is formed on the inner periphery of the lead-in port 300*b*. The cable gland 311 is a hollow member made of, for example, metal or resin, and has one end with an outer periphery on which a male screw has been formed. The male screw is screwed into the female screw formed in the lead-in port 300*b*, to attach the cable gland 311 to the lead-in port 300*b*.

As indicated by broken lines in FIG. 4, the control panel-side cable 303 is passed through a hollow portion of the cable gland 311, and is led into the coupling box 300 from the lead-in port 300*b*. Here, the cable gland 311 is an example of a "first member".

The cover member 312 is attached to the control panel-side coupling surface 300*a* of the coupling box 300. The cover member 312 is made of, for example, metal or a material equivalent in strength to metal, and has one end having screw holes to be used for attachment to the control panel-side coupling surface 300*a*. The one end of the cover member 312 is attached to the control panel-side coupling surface 300*a* in the vicinity of the lead-in port 300*b* by means of the screw holes and fastening screws 351.

Screw holes to be used to couple the cover member 312 to the intermediate coupling member 313 have been formed in another end of the cover member 312. The cover member 312 is coupled to the intermediate coupling member 313 by means of the screw holes and fastening screws 353.

The cover member 312 includes a first cover 3121 and a second cover 3122. The first cover 3121 covers an outer half (an upper half in FIG. 4) of the cable gland 311. The second cover 3122 covers the remaining outer half (a lower half in FIG. 4) of the cable gland 311. Screw holes to be used for joining the first cover 3121 and the second cover 3122 have been formed in the first cover 3121 and the second cover 3122. The first cover 3121 and the second cover 3122 are joined by means of the screw holes and fastening screws 352 (see FIG. 5). Here, the first cover 3121 and the second cover 3122 are an example of a "plurality of divided covers".

With the above configuration, the cover member 312 covers the periphery of the cable gland 311 to protect the cable gland 311 from an external load, in the state of being fastened by the fastening screws 351, 352, and 353. Therefore, the cable gland 311 does not necessarily need to be made of metal. Thus, it is possible to choose a resin-made lightweight cable gland, leading to an increase in the degree of freedom in design.

In a state in which the fastening screws 351, 352, and 353 are undone, the cover member 312 can be divided in a direction (vertical direction in FIG. 4) crossing a direction (horizontal direction in FIG. 4) in which the control panel-side cable 303 is led inside.

In order to maintain airtightness between the cable gland 311 and the coupling box 300, it is necessary to periodically check whether the cable gland 311 is loosened in the lead-in port 300*b*. In the case of performing such a check, an operator can remove the cover member 312 (the first cover 3121 and the second cover 3122) to easily expose the cable gland 311. Thus, the operator can access the cable gland 311. In addition, since the fastening screws 351, 352, and 353 are used for fastening at fastening portions of the cover member 312, the cover member 312 can be easily attached and detached by means of a fastening tool such as a torque wrench. Here, the fastening screws 351, 352, and 353 are examples of "fastener".

As described above, the cable lead-in member according to the present embodiment includes: the cable gland 311 to be attached to the lead-in port 300b through which the control panel-side cable 303 is to be led inside; and the cover member 312 that protects the cable gland 311, wherein the cover member 312 is provided in such a way as to be divisible in the direction crossing the direction in which the control panel-side cable 303 is to be led inside.

As described above, the cover member 312 includes the first cover 3121 and the second cover 3122 fastened by the fastener.

As a result, it is easy to replace only the cable gland, and it is possible to reduce the cost of part replacement for the cable lead-in member. In addition, it is possible both to protect the cable gland from an external load and to improve accessibility to the cable gland at the time of checking the cable gland.

As described above, the fastener are the fastening screws 351, 352, and 353.

This makes it possible to easily attach and detach the cover member with a general-purpose tool.

The intermediate coupling member 313 and the lead-in port 300b are located on opposite sides of the cable gland 311. The intermediate coupling member 313 is made of, for example, an aluminum alloy, and has one end having screw holes to be used to couple the intermediate coupling member 313 to the cover member 312. The one end of the intermediate coupling member 313 is fitted into the cover member 312 in such a way as to align the screw holes with the screw holes of the cover member 312. The one end of the intermediate coupling member 313 is coupled to the cover member 312 by means of the screw holes of the cover member 312 and the intermediate coupling member 313 and the fastening screws 353. A female screw is formed on the inner periphery of another end of the intermediate coupling member 313.

Note that the method for coupling the intermediate coupling member 313 to the cover member 312 is not limited to fastening with the fastening screws 353. For example, as with attachment of the cable gland 311 to the lead-in port 300b, the cover member 312 and the intermediate coupling member 313 may be configured as follows. A female screw is provided on the inner periphery of the cover member 312, and a male screw is provided on the outer periphery of the intermediate coupling member 313. Thus, the male screw is screwed into the female screw to couple the intermediate coupling member 313 to the cover member 312.

The cable protecting tube coupling member 314 is coupled to the other end of the intermediate coupling member 313. The cable protecting tube coupling member 314 is made of, for example, metal or a material equivalent in strength to metal, and has one end with an outer periphery on which a male screw has been formed. The male screw is screwed into the female screw formed on the inner periphery of the other end of the intermediate coupling member 313 to couple the one end of the cable protecting tube coupling member 314 to the intermediate coupling member 313.

In addition, a sealing member 354 such as packing is provided at a joint portion between the intermediate coupling member 313 and the cable protecting tube coupling member 314. This ensures the airtightness of the joint portion to prevent entry of foreign matter from the outside. In addition, the cable protecting tube coupling member 314 has another end with an inner periphery on which a protrusion 314a has been formed.

Here, the intermediate coupling member 313 is an example of a "first intermediate member", and the cable protecting tube coupling member 314 is an example of a "second intermediate member". In addition, a combination of the first intermediate member and the second intermediate member is defined as a "second member".

In the present embodiment, the second member includes the intermediate coupling member 313 (first intermediate member) and the cable protecting tube coupling member 314 (second intermediate member). Meanwhile, the intermediate coupling member 313 and the cable protecting tube coupling member 314 may be integrated such that the second member is a single member.

As described above, the cable lead-in member 310 includes the cable gland 311, the cover member 312, the intermediate coupling member 313, and the cable protecting tube coupling member 314. In addition, these members form a cable insertion portion 310a penetrating the cable protecting tube coupling member 314 from the lead-in port 300b when coupled to each other.

The control panel-side cable 303 exposed to the outside of the cable insertion portion 310a is covered with the cable protecting tube 320 and protected from an external load. The cable protecting tube 320 is coupled to the other end of the cable protecting tube coupling member 314. The cable protecting tube 320 is made of, for example, a resin material, and has a hollow structure. In addition, the cable protecting tube 320 has an outer periphery with a spiral groove. The protrusion 314a formed on the inner periphery of the other end of the cable protecting tube coupling member 314 is screwed into this spiral groove to couple the cable protecting tube coupling member 314 to the cable protecting tube 320.

As described above, the cable lead-in member 310 includes the second member. The second member and the lead-in port 300b are located on opposite sides of the cable gland 311. The cover member 312 has one end coupled to the coupling box 300 in the vicinity of the lead-in port 300b, and has another end coupled to the second member.

As a result, each member (part) included in the cable lead-in member can be configured in association with a function necessary for each member. In addition, it is not necessary to replace the entire cable lead-in member when replacing any parts. Thus, the cost of part replacement can be reduced.

As described above, the second member includes the intermediate coupling member 313 and the cable protecting tube coupling member 314. One end of the intermediate coupling member 313 is coupled to the cover member 312, and another end of the intermediate coupling member 313 is coupled to one end of the cable protecting tube coupling member 314 via the sealing member 354.

Accordingly, it is possible to provide a cable lead-in member having higher airtightness.

The cable lead-in portion of the control panel-side cable 303 that couples the coupling box 300 and the control panel 900 has been cited in the above description. Meanwhile, the present disclosure is not limited thereto. For example, in a case where no solvent is used as liquid, the cable lead-in member 310 may be used for the cable lead-in portion of the head-side cable 304.

Modification

Figure 6:
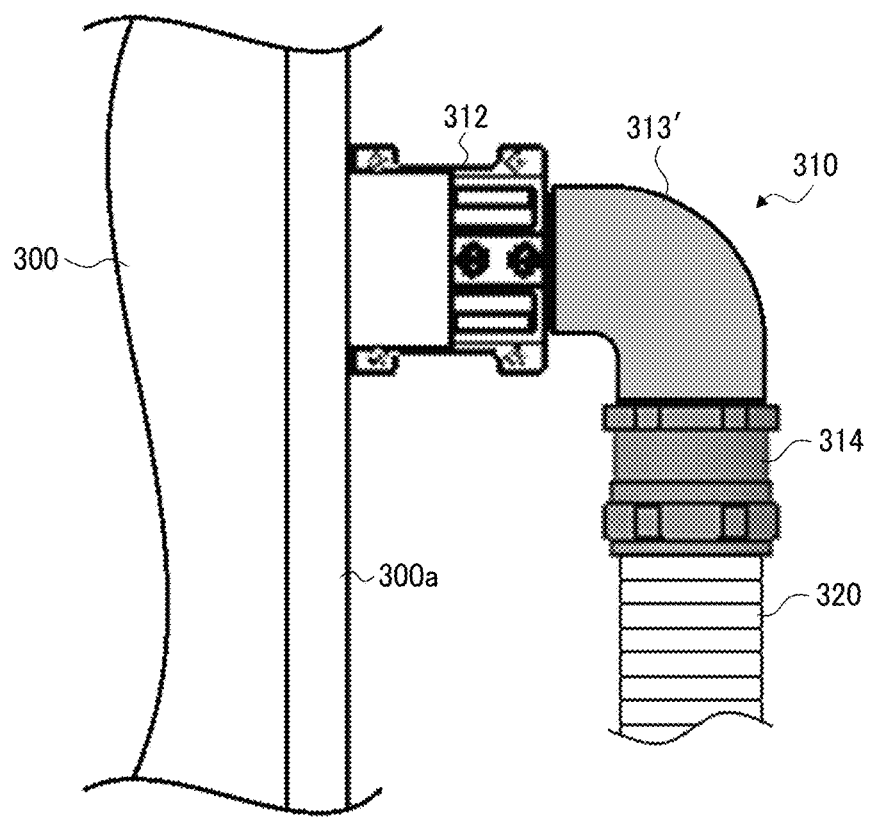
FIG. 6 is an explanatory diagram of a modification.

FIG. 6 is an explanatory diagram of a modification.

Here, advantages in dividing the second member into the intermediate coupling member 313 and the cable protecting tube coupling member 314 will be particularly described. When the second member is divided into the intermediate coupling member 313 and the cable protecting tube coupling member 314, it is possible to easily cope with a change in the wiring path of the electric cable.

That is, the intermediate coupling member 313 exemplified in the above-described embodiment is shaped in such a way as to guide the electric cable substantially perpendicularly to the coupling surface 300*a* of the coupling box 300. Meanwhile, the shape of the intermediate coupling member 313 is not limited thereto. For example, as illustrated in FIG. 6, an intermediate coupling member 313' may be used which has been shaped in such a way as to bend the electric cable in an L shape or curve the electric cable to guide the electric cable to the coupling surface 300*a*. Thus, the electric cable may be guided to the coupling surface 300*a* along a desired wiring path.

As a result, the electric cable can be led into the coupling box 300 with a smaller load. In addition, the intermediate coupling member 313 (313') just needs to be changed according to the wiring path of the electric cable, and other members can be used in common as they are. Thus, the cost of part replacement accompanying a change in the wiring path can also be reduced.

As described above, the intermediate coupling member 313 can be changed according to the wiring path of the electric cable.

As a result, the electric cable can be guided to the coupling box 300 with a smaller load.

The above-described embodiment and modification of the present disclosure are examples, and the following aspects of the present disclosure can provide, for example, advantageous effects to be described below.

First Aspect

According to a first aspect, a cable lead-in member (for example, the cable lead-in member 310) includes: a first member (for example, the cable gland 311) to be attached to a lead-in port (for example, the lead-in port 300*b*) through which a cable (for example, the control panel-side cable 303) is to be led inside; and a cover member (for example, the cover member 312) that protects the first member. The cover member is divisible in a direction crossing a direction in which the cable is to be led inside.

Second Aspect

According to a second aspect, in the cable lead-in member of the first aspect, the cover member includes a plurality of divided covers (for example, the first cover 3121 and the second cover 3122) fastened with a fastener.

Third Aspect

According to a third aspect, in the cable lead-in member of the second aspect, the fastener includes a fastening screw (for example, the fastening screws 351, 352, and 353).

Fourth Aspect

According to a fourth aspect, the cable lead-in member of the first or second aspect further includes a second member. The second member and the lead-in port are located on opposite sides with respect to the first member. The cover member has one end coupled to a portion in the vicinity of the lead-in port and has another end coupled to the second member.

Fifth Aspect

According to a fifth aspect, the cable lead-in member of the fourth aspect further includes a sealing member (for example, the sealing member 354). The second member includes a first intermediate member (for example, the intermediate coupling member 313) and a second intermediate member (for example, the cable protecting tube coupling member 314). One end of the first intermediate member is coupled to the cover member. Another end of the first intermediate member is coupled to one end of the second intermediate member via the sealing member (for example, the sealing member 354).

Sixth Aspect

According to a sixth aspect, in the cable lead-in member of the fifth aspect, the first intermediate member is changeable (for example, the intermediate coupling member 313') according to a wiring path of the cable.

Seventh Aspect

According to a seventh aspect, an electric device control system includes: an electric device (for example, the electric device 1); a controller (for example, the control panel 9) that controls the electric device; and a coupling portion (for example, the coupling box 3) that couples an electric device-side cable (for example, the electric device-side cable 34) and a controller-side cable (for example, the control panel-side cable 33), the electric device-side cable being from the electric device, the controller-side cable being from the controller. The coupling portion (for example, the coupling box 3) is provided with a lead-in port for the electric device-side cable (for example, the electric device-side cable 34) and a lead-in port for the controller-side cable (for example, the control panel-side cable 33). The cable lead-in member of any one of the first to sixth aspects is provided at at least one of the lead-in port for the electric device-side cable and the lead-in port for the controller-side cable.

Eighth Aspect

According to an eighth aspect, a liquid application system includes: the electric device control system of the seventh aspect. The electric device includes a liquid application apparatus (for example, the head 100) that applies a liquid to a target object (for example, the target object W).

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A cable lead-in member, comprising:
a first structure to be attached to a lead-in port through which a cable is to be led inside, the first structure including a circular structure to secure the first structure to the lead-in port, the first structure including a hollow portion through which the cable is to pass, the first structure to secure the cable and prevent the cable from sliding through the hollow portion; and a cover that protects the first structure,
wherein the cover is divisible in a direction crossing a direction in which the cable is to be led inside, and
wherein the first structure includes a cable gland.

2. The cable lead-in member according to claim 1, wherein the cover includes a plurality of divided covers fastened with a fastener.

3. The cable lead-in member according to claim 2, wherein the fastener includes a fastening screw.

4. The cable lead-in member according to claim 1, further comprising:
a second structure,
wherein the second structure and the lead-in port are located on opposite sides with respect to the first structure,
wherein the cover has one end coupled to a portion in vicinity of the lead-in port, and has another end coupled to the second structure.

5. The cable lead-in member according to claim 4, further comprising a sealing member,
wherein the second structure includes a first intermediate structure and a second intermediate structure,
one end of the first intermediate structure is coupled to the cover, and
another end of the first intermediate structure is coupled to one end of the second intermediate structure via the sealing member.

6. The cable lead-in member according to claim 5, wherein the first intermediate structure is changeable according to a wiring path of the cable.

7. An electric device control system, comprising:
an electric device;
a controller to control the electric device;
a cable lead-in member, including:
a first structure to be attached to a lead-in port through which a cable is to be led inside; and
a cover that protects the first structure, wherein the cover is divisible in a direction crossing a direction in which the cable is to be led inside; and
a coupler that couples an electric device-side cable and a controller-side cable, the electric device-side cable being from the electric device, the controller-side cable being from the controller,
wherein the coupler includes a lead-in port for the electric device-side cable and a lead-in port for the controller-side cable,
wherein the cable lead-in member includes at least one of the lead-in port for the electric device-side cable and the lead-in port for the controller-side cable.

8. A liquid application system, comprising:
an electric device control system, including:
an electric device;
a controller to control the electric device;
a cable lead-in member, including:
a first structure to be attached to a lead-in port through which a cable is to be led inside; and
a cover that protects the first structure,
wherein the cover is divisible in a direction crossing a direction in which the cable is to be led inside; and
a coupler that couples an electric device-side cable and a controller-side cable, the electric device-side cable being from the electric device, the controller-side cable being from the controller,
wherein the coupler includes a lead-in port for the electric device-side cable and a lead-in port for the controller-side cable,
wherein the cable lead-in member includes at least one of the lead-in port for the electric device-side cable and the lead-in port for the controller-side cable,
wherein the electric device includes a liquid application apparatus to apply a liquid to a target object.

9. The cable lead-in member according to claim 1, wherein:
the circular structure includes threads which are to pass through the lead-in port.

10. The electric device control system according to claim 7, wherein:
the first structure including a circular structure to secure the first structure to the lead-in port, the first structure including a hollow portion through which the cable is to pass, the first structure to secure the cable and prevent the cable from sliding through the hollow portion.

11. The electric device control system according to claim 10, wherein:
the first structure includes a cable gland.

12. The electric device control system according to claim 11, wherein:
the circular structure includes threads which are to pass through lead-in port.

13. The liquid application system according to claim 8, wherein:
the first structure including a circular structure to secure the first structure to the lead-in port, the first structure including a hollow portion through which the cable is to pass, the first structure to secure the cable and prevent the cable from sliding through the hollow portion.

14. The liquid application system according to claim 13, wherein:
the first structure includes a cable gland.

15. The liquid application system according to claim 14, wherein:
the circular structure includes threads which are to pass through the lead-in port.

* * * * *